United States Patent
Hosokawa

(10) Patent No.: US 10,089,881 B2
(45) Date of Patent: Oct. 2, 2018

(54) DRIVING SUPPORT DEVICE

(71) Applicant: TOYOTA JIDOSHA KABUSHIKI KAISHA, Toyota-shi, Aichi-ken (JP)

(72) Inventor: Masayuki Hosokawa, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/858,473

(22) Filed: Dec. 29, 2017

(65) Prior Publication Data

US 2018/0204461 A1 Jul. 19, 2018

(30) Foreign Application Priority Data

Jan. 13, 2017 (JP) ................................. 2017-004690

(51) Int. Cl.
*G08G 1/16* (2006.01)
*G08G 1/0967* (2006.01)

(52) U.S. Cl.
CPC ....... *G08G 1/166* (2013.01); *G08G 1/096783* (2013.01)

(58) Field of Classification Search
CPC .......................... G08G 1/166; G08G 1/096783
See application file for complete search history.

(56) References Cited

U.S. PATENT DOCUMENTS

| 9,318,023 | B2* | 4/2016 | Moshchuk | ............. | G08G 1/167 |
| 2010/0100324 | A1* | 4/2010 | Caminiti | ............. | G08G 1/0104 |
| | | | | | 701/301 |
| 2011/0087433 | A1* | 4/2011 | Yester | .................... | G08G 1/163 |
| | | | | | 701/301 |
| 2017/0369055 | A1* | 12/2017 | Saigusa | ................ | B60W 30/09 |

FOREIGN PATENT DOCUMENTS

JP 3899515 B2 3/2007

* cited by examiner

*Primary Examiner* — Nader Bolourchi
(74) *Attorney, Agent, or Firm* — Hunton Andrews Kurth LLP

(57) ABSTRACT

A driving support device is configured to restrict notification of information on a presence of an oncoming vehicle in an opposing path entering the intersection to a driver of a host vehicle over a restriction period which is a period from a first time point at which it is determined that a state of a traffic signal has been switched from a first state in which the turn of the host vehicle is prohibited to a second state in which the turn of the host vehicle is permitted to a time point at which it is estimated that the host vehicle is able to perform the turn at an intersection based on information on the state of the host vehicle after the first time point, and to release the restriction of the notification of the information when the restriction period has elapsed from the first time point.

7 Claims, 5 Drawing Sheets

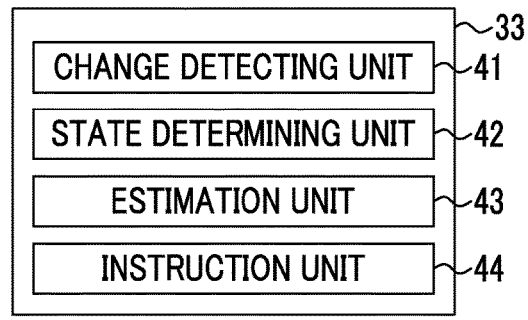
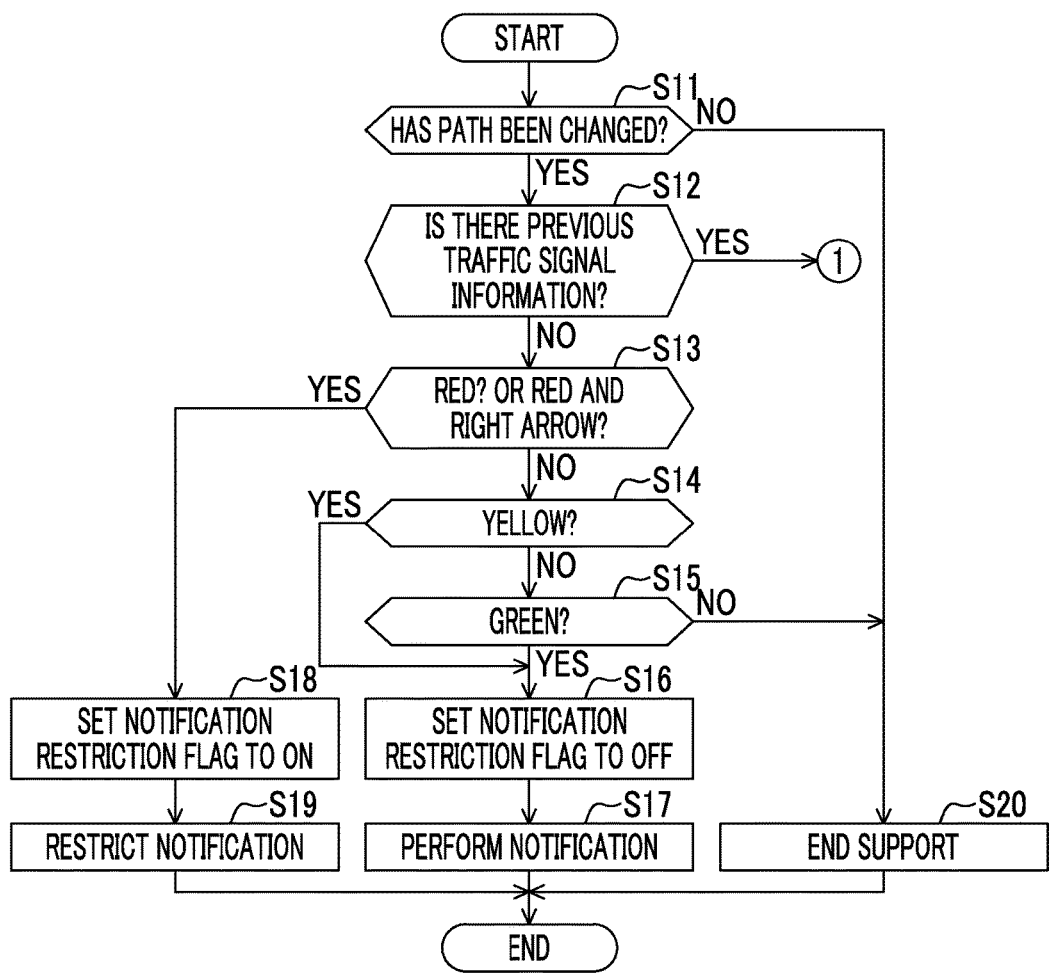

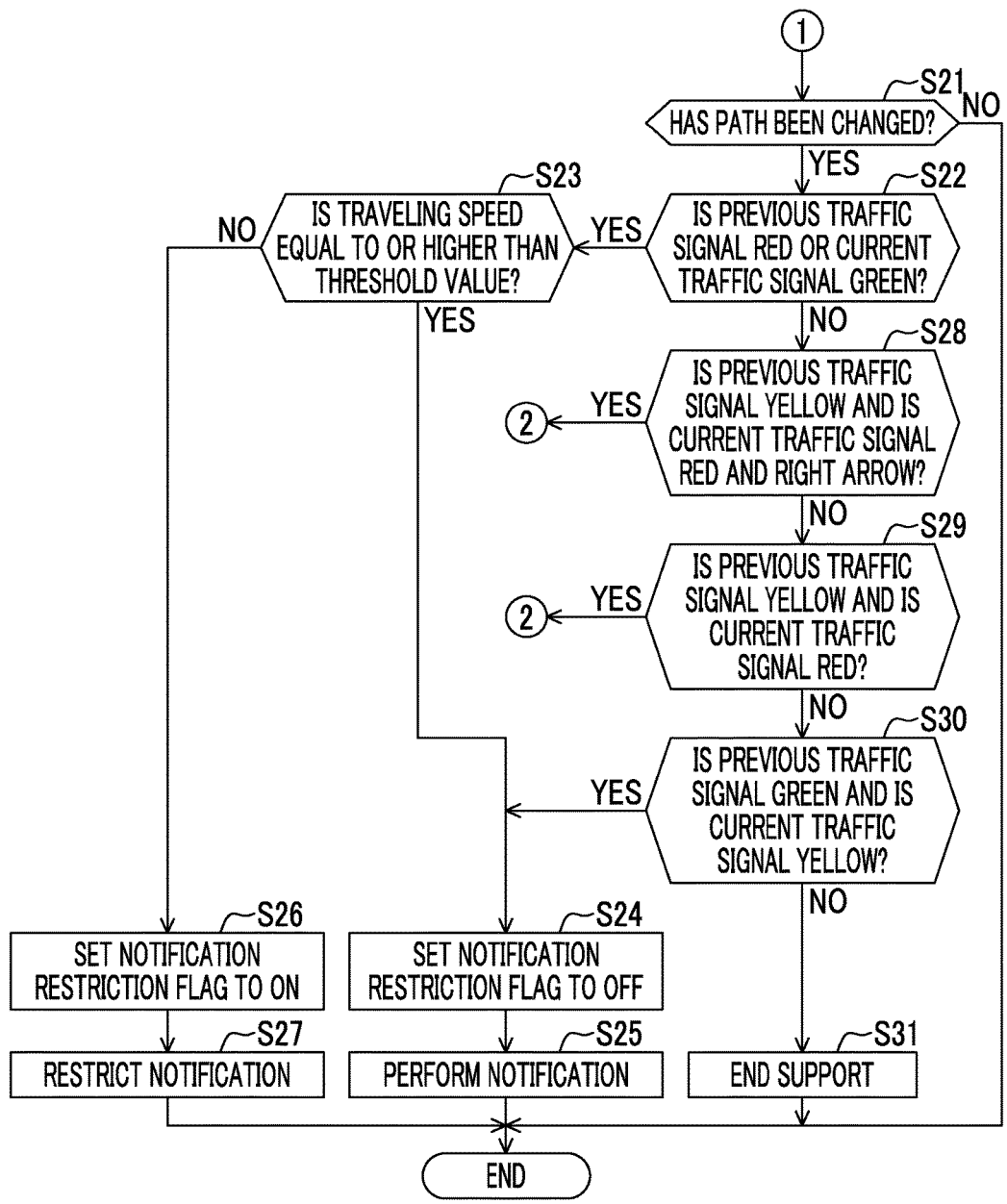

DRIVING SUPPORT DEVICE

INCORPORATION BY REFERENCE

The disclosure of Japanese Patent Application No. 2017-004690 filed on Jan. 13, 2017 including the specification, drawings and abstract is incorporated herein by reference in its entirety.

BACKGROUND

1. Technical Field

The disclosure relates to a driving support device that supports a driver's driving of a vehicle.

2. Description of Related Art

A driving support device that notifies a driver, who intends a host vehicle to turn to the right at an intersection, of the presence of an oncoming vehicle when there is an oncoming vehicle located in a lane opposing a lane in which the host vehicle is located is known. When the host vehicle is a leading vehicle in the lane in which the host vehicle is located, the driving support device notifies the driver that an oncoming vehicle is present through display or voice. On the other hand, when the host vehicle is not a leading vehicle, notification through voice is restricted for the purpose of preventing the driver from feeling annoyed due to the notification from the driving support device (for example, see Japanese Patent No. 3899515 (JP 3899515 B)).

SUMMARY

However, in the driving support device, a change in a state of a traffic signal which is obeyed by the host vehicle at an intersection and a traffic flow following the change of the state is not considered when information on the presence of an oncoming vehicle is notified.

In a road including lanes in which traveling directions of vehicles are different, when a path of a host vehicle changes to cross a traveling path of an oncoming vehicle at an intersection, for example, when a vehicle traveling in the right lane turns to the left, for example, as well as when a vehicle traveling in the left lane turns to the right, it is preferable that notification be performed to be suitable for a traffic flow following a change in state of a traffic signal.

The disclosure provides a driving support device that can perform notification of the presence of an oncoming vehicle which is suitable for a traffic flow following a change in state of a traffic signal in a path change of a host vehicle in which the host vehicle crosses a traveling path of an oncoming vehicle at an intersection.

A driving support device according to a first aspect of the disclosure includes: a notification unit configured to notify a driver of a host vehicle of information; and, at least one electronic control unit. The at least one electronic control unit is configured to: detect that a path change in which a path of the host vehicle is changed from a first path in which the host vehicle enters an intersection to a second path in which host vehicle departs from the intersection through a turn at the intersection and the host vehicle crosses a third path which is a path opposing the first path through the turn is to be performed; notify the driver of information on a presence of an oncoming vehicle in the third path entering the intersection, by the notification unit; acquire a state of a traffic signal which is obeyed by the host vehicle at the intersection; determine whether the state of the traffic signal has been switched from a first state in which the turn of the host vehicle is prohibited to a second state in which the turn of the host vehicle is permitted; estimate whether the host vehicle is able to perform the turn at the intersection based on information on a state of the host vehicle; and restrict notification of the information from the notification unit over a restriction period which is a period from a first time point at which it is determined that the state of the traffic signal has been switched from the first state to the second state to a time point at which the host vehicle is estimated to be able to perform the turn at the intersection based on the information on the state of the host vehicle after the first time point, and to release the restriction of the notification of the information when the restriction period has elapsed from the first time point, in a state in which it is detected that the path change is to be performed.

Immediately after the state of the traffic signal which is obeyed by the host vehicle has been switched from the first state to the second state when the host vehicle performs a path change based on a turn at an intersection, generally, a driver of the host vehicle is assumed to cause the host vehicle to travel from a stop position to a turn start position at the intersection, check that pedestrians or bicycles are not present in front of the turn, or check that other vehicles have not stopped in front of the turn. Thereafter, the driver is assumed to cause the host vehicle to turn at the intersection. Accordingly, when the driver is notified of information on the presence of an oncoming vehicle which travels in a traveling path of the oncoming vehicle at this time, the notification is not suitable for a traffic flow following the change in state of the traffic signal. In this regard, according to the above-mentioned configuration, notification from the notification unit is restricted by the electronic control unit until the electronic control unit estimates that the host vehicle can turn after the state of the traffic signal has been switched from the first state to the second state. Accordingly, at the time of a path change based on a turn of the host vehicle, it is possible to perform notification suitable for a traffic flow following the change in state of the traffic signal.

In the first aspect, the at least one electronic control unit may be configured to: acquire a traveling speed of the host vehicle; and estimate that the host vehicle is able to perform the turn at the intersection when the traveling speed of the host vehicle is equal to or higher than a predetermined speed after it is determined that the state of the traffic signal has been switched from the first state to the second state.

According to this configuration, when the host vehicle starts a path change, the driver generally sets the speed of the host vehicle to be higher than that when the host vehicle moves from a stop position which is a position short of the intersection to a turn start position, when the driver checks whether pedestrians or bicycles are present at a turn destination, or when the driver checks whether other vehicles have stopped at the turn destination. In this regard, according to the configuration, when the traveling speed of the host vehicle is equal to or higher than a predetermined speed, the electronic control unit estimates that the host vehicle can turn. Accordingly, when the driver causes the host vehicle to turn, a probability that information on the presence of an oncoming vehicle will be notified from the notification unit increases. As a result, it is possible to perform notification suitable for a traffic flow following a change in state of a traffic signal.

In the first aspect, the at least one electronic control unit may be configured to estimate that the host vehicle is able to perform the turn when a predetermined time has elapsed from the first time point.

According to this configuration, at the time of a path change of the host vehicle, a predetermined time is required to cause the host vehicle to move from a stop position which is a position short of the intersection to a turn start position, to check whether pedestrians or bicycles are present at a turn destination, or to check whether other vehicles have stopped at the turn destination. In this regard, according to the configuration, when a predetermined time has elapsed from a time point at which the electronic control unit determines that the state of the traffic signal has been switched from the first state to the second state, the electronic control unit estimates that the host vehicle can turn. Accordingly, when the driver causes the host vehicle to turn, a probability that information on the presence of an oncoming vehicle will be notified from the notification unit increases. As a result, it is possible to perform notification suitable for a traffic flow following a change in state of a traffic signal.

In the first aspect, the second state may be a state in which the turn and traveling straight ahead for passing the intersection is both permitted, the first state may be a state in which the turn and the traveling straight ahead is prohibited. The at least one electronic control unit may be configured to: determine whether the state of the traffic signal has been switched from the second state to the first state; and release the restriction of the notification over a period in which the state of the traffic signal is the second state after the restriction period has elapsed and switch a state of the notification unit from a state in which the restriction of the notification is released to a state in which the notification is restricted when a first predetermined period has elapsed from a second time point at which it is determined that the state of the traffic signal has been switched from the second state to the first state.

A driving support device according to a second aspect of the disclosure includes: a notification unit configured to notify a driver of a host vehicle of information; and at least one electronic control unit. The at least one electronic control unit may be configured to: detect that a path change in which a path of the host vehicle is changed from a first path in which the host vehicle enters an intersection to a second path in which the host vehicle departs from the intersection through a turn at the intersection and the host vehicle crosses a third path opposing the first path through the turn is to be performed; notify the driver of information on a presence of an oncoming vehicle in the third path entering the intersection, by the notification unit; acquire a state of a traffic signal which is obeyed by the host vehicle at the intersection; determine whether the state of the traffic signal has been switched from a second state in which the turn and traveling straight ahead for passing through the intersection is permitted to a first state in which the turn and the traveling straight ahead is prohibited; and switch a state of the notification unit from a state in which restriction of the notification is released to a state in which the notification is restricted when a predetermined period has elapsed after it is determined that the state of the traffic signal has been switched from the second state to the first state in a state in which the path change is detected to be performed.

When the state of the traffic signal is the first state in which a turn of the host vehicle is prohibited, the driver does not generally perform a path change based on a turn. However, immediately after the state of the traffic signal has been switched from the second state to the first state, the driver may cause the host vehicle to turn. In this regard, according to the configuration, the notification unit performs notification over a predetermined period after the state of the traffic signal has been switched from the second state to the first state, and notification from the notification unit is restricted when the predetermined period has elapsed. Accordingly, it is possible to perform notification suitable for a traffic flow following a change in state of a traffic signal.

In the first aspect, the second state may be a state in which the turn and traveling straight for passing through the intersection is both permitted, and The at least one electronic control unit may be configured to: determine whether the state of the traffic signal has been switched from the second state to a third state in which only the turn from the turn and the traveling straight ahead of the host vehicle is permitted; and release the restriction of the notification over a period in which the state of the traffic signal is the second state after the restriction period has elapsed and switch a state of the notification unit from a state in which the restriction of the notification is released to a state in which the notification is restricted when a second predetermined period has elapsed from a third time point at which it is determined that the state of the traffic signal has been switched from the second state to the third state.

A driving support device according to a third aspect of the disclosure includes: a notification unit configured to notify a driver of a host vehicle of information; and at least one electronic control unit. The at least one electronic control unit is configured to; detect that a path change in which a path is changed from a first path in which the host vehicle enters an intersection to a second path in which the host vehicle departs from the intersection through a turn at the intersection and the host vehicle crosses a third path opposing the first path through the turn is performed; notify the driver of information on a presence of an oncoming vehicle in the third path entering the intersection, by the notification unit; acquire a state of a traffic signal which is obeyed by the host vehicle at the intersection; determine whether the state of the traffic signal has been switched from a second state in which the turn and traveling straight ahead for passing through the intersection is both performed to a third state in which only the turn from the turn and the traveling straight is permitted; and switch a state of the notification unit from a state in which restriction of the notification is released to a state in which the notification is restricted when a predetermined period has elapsed after it is determined that the state of the traffic signal has been switched from the second state to the third state in a state in which the path change is detected to be performed.

When the state of the traffic signal is the third state, there is a high likelihood that the traffic signal which is obeyed by an oncoming vehicle will indicate prohibition of passage through the intersection based on traveling straight ahead. However, immediately after the state of the traffic signal which is obeyed by the host vehicle has been switched from the second state to the third state, there is a likelihood that an oncoming vehicle will travel straight ahead and pass through the intersection even when the traffic signal which is obeyed by the oncoming vehicle indicates prohibition of passage through the intersection based on traveling straight ahead. In this regard, according to the configuration, the notification unit performs notification over a predetermined period after the state of the traffic signal has been switched from the second state to the third state, and notification from the notification unit is restricted when the predetermined period has elapsed. Accordingly, it is possible to perform notification suitable for a traffic flow following a change in state of a traffic signal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a block diagram illustrating a configuration of a support calculation unit which is included in the driving support device according to the embodiment;

FIG. 6 is a flowchart illustrating a routine of a driving support process which is performed by a control unit according to the embodiment;

FIG. 7 is a flowchart illustrating a routine of a driving support process which is performed by the control unit according to the embodiment;

DETAILED DESCRIPTION OF EMBODIMENTS

A driving support device according to an embodiment of the disclosure will be described below with reference to FIGS. 1 to 9. The driving support device according to the embodiment is a driving support device that is mounted in a vehicle and supports a driver's driving of the vehicle in a situation in which the host vehicle travels in a lane located on the left side of a lane in which an oncoming vehicle travels in a traveling direction of the host vehicle and the host vehicle turns to the right as a turn at the time of crossing a traveling path of the oncoming vehicle at an intersection. Hereinafter, a configuration of a driving support system, a driving support process which is performed by the driving support device, and an operation of the driving support device will be sequentially described.

[Configuration of Driving Support System]

Figure 1:
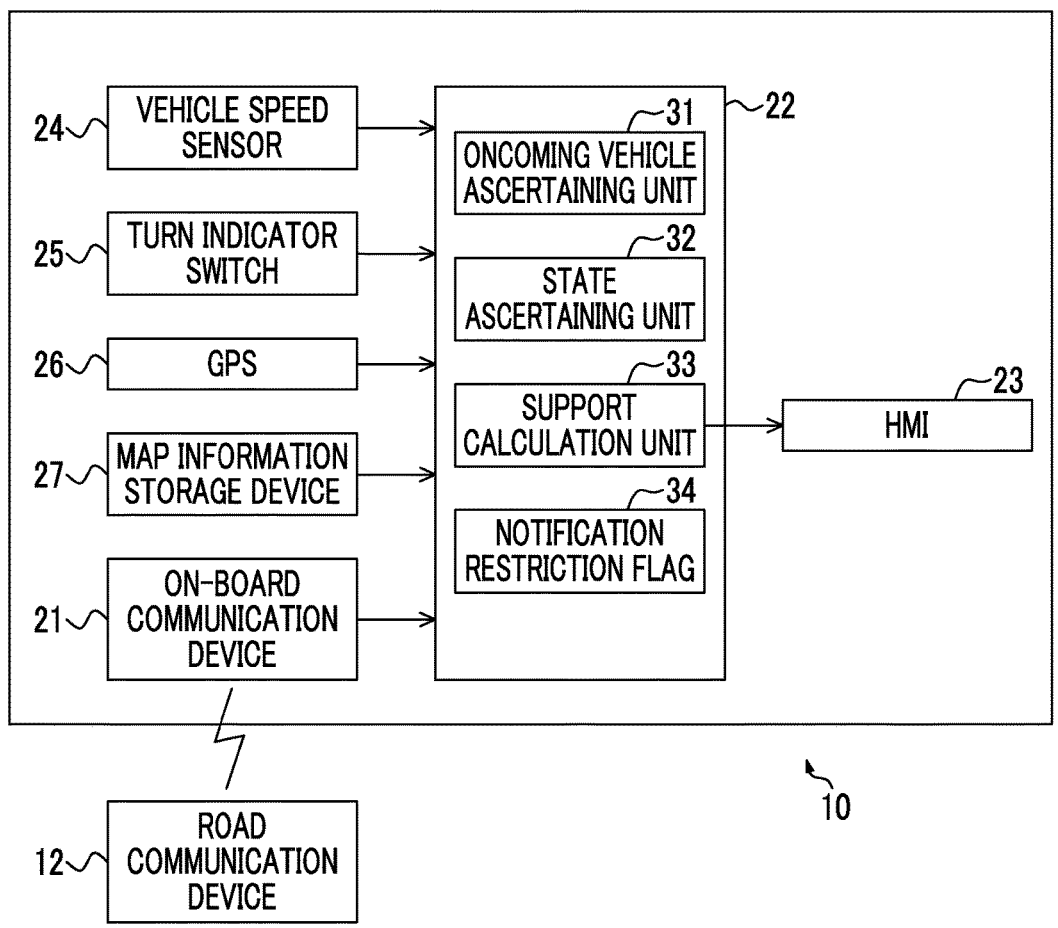
FIG. 1 is a block diagram illustrating a configuration of a driving support system including a driving support device according to an embodiment of the disclosure.

A configuration of the driving support system will be described below with reference to FIGS. 1 to 3. As illustrated in FIG. 1, the driving support system 10 includes a host vehicle 11 and a road communication device 12. The road communication device 12 is installed, for example, several hundreds of meters short of an intersection at which a traffic signal is located. The road communication device 12 transmits a state of the traffic signal installed at the intersection as traffic signal information, for example, at predetermined time intervals. The road communication device 12 acquires the presence or absence of an oncoming vehicle which travels at the intersection as oncoming vehicle information from ground facilities and transmits the acquired oncoming vehicle information.

The host vehicle 11 includes an on-board communication device 21, a control device 22, a human-machine interface (HMI) 23, a vehicle speed sensor 24, a turn indicator switch 25, a GPS receiver 26, and a map information storage device 27. The on-board communication device 21 communicates with the road communication device 12. The on-board communication device 21 receives the traffic signal information or the oncoming vehicle information transmitted from the road communication device 12 and appropriately outputs the received traffic signal information or the received oncoming vehicle information to the control device 22 which uses the traffic signal information and the oncoming vehicle information. The on-board communication device 21 is an example of a state acquiring unit that acquires a state of a traffic signal which is obeyed by the host vehicle 11 at an intersection.

The HMI 23 is an example of a notification unit and notifies a driver of the host vehicle 11 of information on the presence of an oncoming vehicle which enters the intersection. The HMI 23 includes, for example, a voice output device, a head-up display, a monitor of a navigation system, and a meter panel. When a notification signal is input from the control device 22, for example, the HMI 23 notifies the driver of the presence of an oncoming vehicle by voice or notifies the driver of the presence of an oncoming vehicle by displaying a message indicating the presence of an oncoming vehicle on the head-up display or the like.

The vehicle speed sensor 24 detects a vehicle speed which is a traveling speed of the host vehicle 11 and outputs a signal corresponding to the detected vehicle speed to the control device 22. The control device 22 is an example of a speed acquiring unit that acquires a traveling speed of the host vehicle 11. The turn indicator switch 25 is a switch which is operated by the driver at the time of a path change due to a right turn of the host vehicle 11. When the turn indicator switch 25 is switched between an ON state and an OFF state by the driver, the turn indicator switch 25 outputs a signal indicating the ON state or a signal indicating the OFF state to the control device 22.

The GPS receiver 26 receives GPS satellite signals for detecting an absolute position of the host vehicle 11 in which the GPS receiver 26 is mounted. The GPS receiver 26 specifies a position of the host vehicle, that is, the longitude and latitude of the host vehicle, based on the received GPS satellite signals. The GPS receiver 26 outputs position information indicating the specified position to the control device 22.

Map information is stored in the map information storage device 27. The map information includes, for example, information indicating intersections and the latitude and longitude of each traffic signal. The map information also includes information indicating an arrow type traffic signal or a non-arrow type traffic signal as a type of a traffic signal. The map information includes information indicating that a road is a single-lane road or a double-lane road including opposing lanes or information indicating the latitude and longitude of a road sign representing entry prohibited.

The control device 22 includes an oncoming vehicle ascertaining unit 31, a state ascertaining unit 32, a support calculation unit 33, and a notification restriction flag 34. The oncoming vehicle ascertaining unit 31 ascertains whether an oncoming vehicle having entered an intersection is present among oncoming vehicles entering the intersection, more specifically, oncoming vehicles traveling in an oncoming path opposing a first path in which the host vehicle 11 travels, based on the oncoming vehicle information input to the control device 22.

The notification restriction flag 34 is maintained in an ON state or an OFF state. When the notification restriction flag 34 is maintained in the ON state, notification of information on the presence of an oncoming vehicle which enters an intersection by the HMI 23 is restricted. On the other hand, when the notification restriction flag 34 is maintained in the OFF state, the restriction of notification of information on the presence of an oncoming vehicle is released and information on the presence of an oncoming vehicle is notified. When notification of information on the presence of an oncoming vehicle by the HMI 23 is restricted, notification of information on the presence of an oncoming vehicle is stopped.

The state ascertaining unit 32 ascertains a state of a traffic signal which is obeyed by the host vehicle 11 at the intersection based on the traffic signal information input to the control device 22. The state ascertaining unit 32 ascertains a state of the traffic signal over a predetermined period by accumulating a plurality of traffic signal information pieces in a time series.

Figure 2:
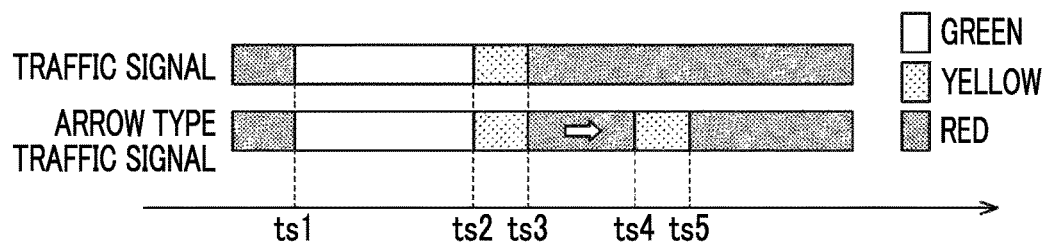
FIG. 2 is a timing chart illustrating an example of a cycle of a traffic signal according to the embodiment.

FIG. 2 illustrates two examples of a state of the traffic signal which is ascertained by the state ascertaining unit 32. The first example relates to a traffic signal including a signal lamp indicating green, a signal lamp indicating yellow, and a signal lamp indicating red, and the second example relates to an arrow type traffic signal including a signal lamp indicating an arrow indicating that a right turn is possible in addition to three signal lamps of the first example.

In the traffic signal of the first example, the green signal lamp is turned on at time ts1, and the state of the traffic signal has been changed from the state in which the green signal lamp is turned on to a state in which the yellow signal lamp is turned on at time ts2. In the traffic signal of the first example, at time ts3, the state of the traffic signal is changed from a state in which the yellow signal lamp is turned on to a state in which the red signal lamp is turned on. In the traffic signal of the first example, a period from time ts1 to time ts1 in a next cycle is one cycle in the state of the traffic signal.

In the traffic signal of the first example, a period between time ts1 to time ts3 in one cycle is a period in which the host vehicle 11 can turn to the right. That is, the state in which the green signal lamp is turned on and the state in which the yellow signal lamp is turned on are examples of a second state in which a right turn of the host vehicle is permitted. On the other hand, in the traffic signal of the first example, a period between time ts3 to time ts1 in a next cycle is a period in which the right turn of the host vehicle 11 is not possible. That is, the state in which the red signal lamp is turned on is an example of a first state in which the right turn of the host vehicle is prohibited.

In the arrow type traffic signal of the second example, the green signal lamp is turned on at time ts1, and the state of the traffic signal is changed from the state in which the green signal lamp is turned on to the state in which the yellow signal lamp is turned on at time ts2. In the arrow type traffic signal of the second example, at time ts3, the state of the traffic signal is changed from the state in which the yellow signal lamp is turned on to the state in which the red signal lamp and the arrow signal lamp indicating a right turn are turned on. In the arrow type traffic signal of the second example, the state of the traffic signal is changed from the state in which the red signal lamp and the arrow signal lamp indicating a right turn are turned on to the state in which the yellow signal lamp is turned on at time ts4, and is changed from the state in which the yellow signal lamp is turned on to the state in which the red signal lamp is turned on at time ts5. In the arrow type traffic signal of the second example, a period from time ts1 to time ts1 in a next cycle is one cycle in the state of the traffic signal.

In the arrow type traffic signal of the second example, a period from time ts1 to time ts5 in one cycle is a period in which the host vehicle 11 can turn to the right. In the period, the state in which the green signal lamp is turned on and the state in which the yellow signal lamp is turned on are examples of the second state, and the state in which the red signal lamp and the arrow signal lamp are turned on is an example of a third state in which only the right turn in passage of the host vehicle through the intersection based on the right turn and the traveling straight ahead is permitted. In the arrow type traffic signal of the second example, a period from times ts5 to time ts1 in a next cycle is a period in which the right turn of the host vehicle 11 is prohibited. That is, the state in which only the red signal lamp is turned on is an example of the first state.

Figure 3:
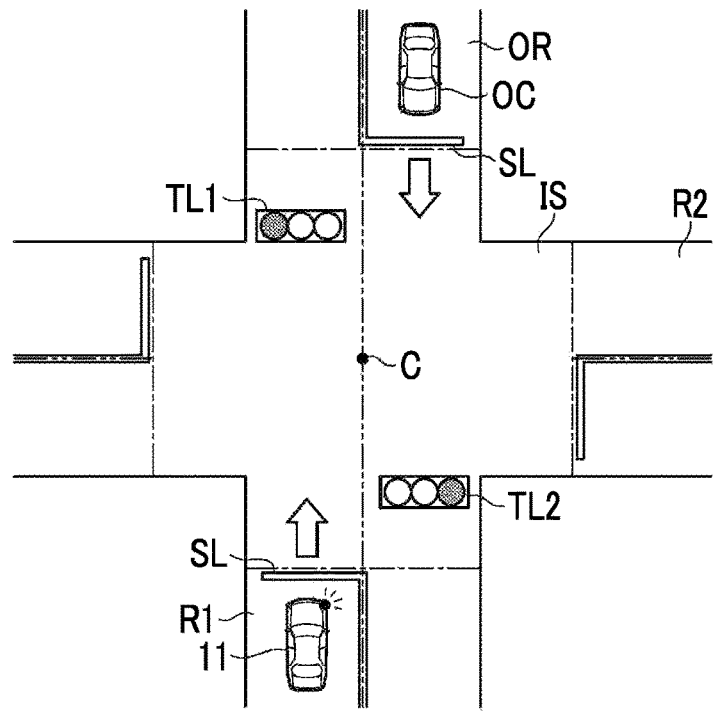
FIG. 3 is a block diagram schematically illustrating a state in which a vehicle stops at a stop position according to the embodiment.
Figure 4:
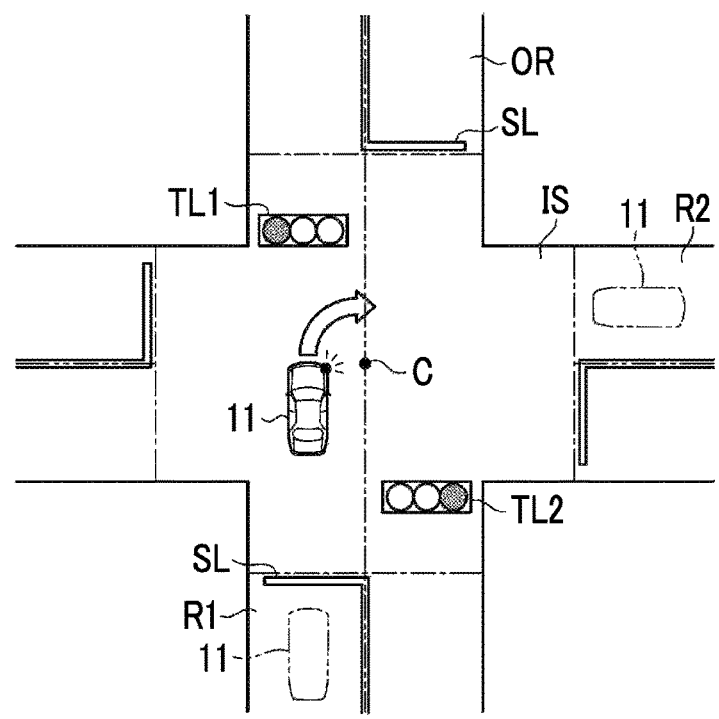
FIG. 4 is a block diagram schematically illustrating a state in which a vehicle is located at a right turn start position at an intersection according to the embodiment.

FIGS. 3 and 4 schematically illustrate sates in which the host vehicle 11 performs a path change based on the right turn at an intersection. In FIGS. 3 and 4, crossroads are illustrated as an example of an intersection.

As illustrated in FIG. 3, a first traffic signal TL1 and a second traffic signal TL2 are installed at an intersection IS, the first traffic signal TL1 is a traffic signal which is obeyed by the host vehicle 11, and the second traffic signal TL2 is a traffic signal which is obeyed by an oncoming vehicle OC.

A first path R1 is a path including the intersection IS and a part for entering the intersection IS, and the host vehicle 11 can enter the intersection IS by traveling in the first path R1. The first path R1 includes a part located opposite to the part for entering the intersection IS with the intersection IS. On the other hand, an opposing path OR in which the oncoming vehicle OC travels is a path opposing the first path R1 and the opposing path OR includes the intersection IS and parts before and after the intersection IS.

When the first traffic signal TL1 is changed from the state in which the red signal lamp is turned on to the state in which the green signal lamp is turned on, that is, at time ts1, the host vehicle 11 is located, for example, at a stop position short of a stop line SL. At this time, a turn indicator indicating the right turn is turned on in the host vehicle 11.

Accordingly, as illustrated in FIG. 4, immediately after the green signal lamp in the first traffic signal TL1 is turned on, a driver needs to cause the host vehicle 11 to travel straight ahead in the first path R1 from the stop position to the central portion C of the intersection IS, that is, a right turn start position. While the host vehicle 11 is traveling from the stop position to a central portion C, the host vehicle 11 cannot turn to the right safely and thus the driver determines that it is not a time at which the host vehicle 11 should turn to the right. When the host vehicle 11 reaches the central portion C and no oncoming vehicle OC is present in the opposing path OR, the driver causes the host vehicle 11 to turn to the right by accelerating the host vehicle 11 and operating a steering wheel to cause the host vehicle 11 to cross the opposing path OR.

Accordingly, the host vehicle 11 entering the intersection IS by traveling in the first path R1 exits from the intersection IS by crossing the opposing path OR and entering the second path R2. The second path R2 is a path in which the host vehicle 11 can travel for exit from the intersection IS. That is, the host vehicle 11 changes its path from the first path R1 for entering the intersection IS to the second path R2 for exiting from the intersection IS via the right turn at the intersection IS.

In this way, the first path R1 and the second path R2 are paths which are specified because the two paths satisfy the following relationship. That is, when a relationship that the host vehicle 11 can enter the intersection IS by traveling in the first path R1, a relationship that the host vehicle 11 can exit from the intersection IS by traveling in the second path R2, and a relationship that the host vehicle 11 can enter the second path R2 by crossing the opposing path OR of the first path R1 are satisfied, the first path R1 and the second path R2 are specified.

The driver generally checks whether pedestrians or bicycles are present in front of the host vehicle 11 turning to the right or whether other vehicles have stopped while the host vehicle 11 travels straight ahead from the stop position to the central portion C of the intersection IS, or in a state in which the host vehicle 11 is located at the central portion C of the intersection IS. Then, the driver generally accelerates the host vehicle 11 to cause the host vehicle 11 to cross the opposing path OR after checking that pedestrians or bicycles are not present in front of the host vehicle 11 turning to the right and other vehicles have not stopped.

In this way, an operation of a steering wheel or an operation of an accelerator pedal for crossing the opposing path OR at the intersection IS is not often performed immediately after the right turn of the host vehicle 11 is permitted by the first traffic signal TL1.

Alternatively, when the driver determines that there is no oncoming vehicle OC that travels in the opposing path OR of the intersection IS immediately after the green signal lamp in the first traffic signal TL1 is turned on, the driver accelerates the host vehicle 11 to cause the host vehicle 11 to cross the opposing path OR.

When the first traffic signal TL1 is changed from the state in which the yellow signal lamp is turned on to the state in which the red signal lamp is turned on, that is, at time ts3 in the traffic signal of the first example, the host vehicle 11 often stops in the vicinity of the stop line SL. For example, when the host vehicle 11 is located closer to the central portion C of the intersection IS than the stop line SL at time ts3, the driver may cause the host vehicle 11 to turn to the right at the intersection IS immediately after time ts3 depending on traffic conditions at the intersection IS.

When the first traffic signal TL1 is changed from the state in which the yellow signal lamp is turned on to the state in which the red signal lamp and the arrow signal lamp indicating the right turn are turned on, that is, at time ts3 in the arrow type traffic signal of the second example, the right turn of the host vehicle 11 is permitted. On the other hand, the second traffic signal TL2 generally prohibits passage of the oncoming vehicle OC through the intersection IS by traveling straight ahead. However, for example, when an oncoming vehicle OC is located closer to the central portion C than the stop line SL in the opposing path OR at time ts3, the oncoming vehicle OC may travel straight ahead through the intersection IS immediately after time ts3 depending on the traffic conditions at the intersection IS.

As illustrated in FIG. 5, the support calculation unit 33 includes a change detecting unit 41, a state determining unit 42, an estimation unit 43, and an instruction unit 44. The support calculation unit 33 performs calculation associated with whether to perform notification of information on the presence of an oncoming vehicle entering the intersection using the HMI 23 so as to be suitable for a traffic flow following the state change of the traffic signal.

The change detecting unit 41 detects a path change of the host vehicle 11 in which the path is changed from the first path R1 for entering the intersection IS to the second path R2 for exiting from the intersection IS via the right turn at the intersection IS. The change detecting unit 41 detects a path change in which the host vehicle 11 crosses the opposing path OR opposing the first path R1 by a right turn during the path change.

The change detecting unit 41 detects a path change of the host vehicle 11 by the right turn, for example, based on position information of the host vehicle 11 input to the control device 22, map information, and a signal indicating the state of the turn indicator switch 25. For example, when it is detected that the host vehicle 11 is located in the vicinity of the intersection IS based on the position information and the map information and a signal indicating that the turn indicator switch 25 is in the ON state is input, the change detecting unit 41 detects the path change of the host vehicle 11.

When a road including the first path R1 in which the host vehicle 11 travels includes the opposing path OR of the first path R1 in the map information, the change detecting unit 41 detects that the host vehicle 11 is located in the vicinity of the intersection IS. The road in which the road including the first path R1 includes the opposing path OR of the first path R1 is, for example, a double-lane road including paths in which vehicles travel in opposite directions or a road not including a road sign indicating prohibition of entry into the first path R1 from one direction.

On the other hand, when the first path R1 in which the host vehicle 11 travels is a single-lane road and includes a road sign indicating prohibition of entry from one direction in the map information, the change detecting unit 41 does not detect that the host vehicle 11 is located in the vicinity of the intersection IS.

In this way, the change detecting unit 41 detects a start of the path change in which the host vehicle 11 crosses the opposing path OR opposing the first path R1 by the right turn during the path change of the host vehicle 11. The change detecting unit 41 detects an intention that the driver change the path of the host vehicle 11 at the intersection IS, that is, prediction that the host vehicle 11 will change its path at the intersection IS.

The change detecting unit 41 may detect the path change of the host vehicle 11 based on only the position information of the host vehicle 11 input to the control device 22 and the map information, or may detect the path change of the host vehicle 11 based on only the state of the turn indicator switch 25.

The state determining unit 42 determines whether the state of the traffic signal is the following state based on the state of the traffic signal which is ascertained by the state ascertaining unit 32. That is, the state determining unit 42 determines whether the state of the traffic signal has been switched from the first state in which the right turn of the host vehicle 11 is prohibited to the second state in which the right turn of the host vehicle 11 is permitted.

Specifically, the state determining unit 42 determines whether the state of the traffic signal is the following state even when the traffic signal which is obeyed by the host vehicle 11 is any one of the traffic signal of the first example and the arrow type traffic signal of the second example. That is, the state determining unit 42 determines whether the newest state of the traffic signal which is ascertained by the state ascertaining unit 32 is the state in which the green signal lamp is turned on and the previous state of the traffic signal is the state in which the red signal lamp is turned on at the time of determination of the state determining unit 42.

When the second state is a state in which passage of the host vehicle 11 through the intersection by the right turn and the traveling straight ahead, the state determining unit 42 determines whether the state of the traffic signal has been switched from the second state to the first state. Specifically, when the traffic signal which is obeyed by the host vehicle 11 is the traffic signal of the first example, the state determining unit 42 determines whether the newest state of the traffic signal which is ascertained by the state ascertaining unit 32 is the state in which the red signal lamp is turned on and the previous state of the traffic signal is a state in which the yellow signal lamp is turned on at the time of determination of the state determining unit 42.

When the second state is the state in which passage of the host vehicle 11 through the intersection by the right turn and the traveling straight ahead is permitted, the state determining unit 42 additionally determines whether the state of the traffic signal has been switched from the second state to the third state in which only the right turn of the host vehicle 11 is permitted.

Specifically, the traffic signal which is obeyed by the host vehicle 11 is the traffic signal of the second example. At the time of determination of the state determining unit 42, the state determining unit 42 determines whether the newest state of the traffic signal which is ascertained by the state ascertaining unit 32 is the state in which both the red signal lamp and the arrow signal lamp are turned on and the previous signal state of the traffic signal is the state in which the yellow signal lamp is turned on.

In this way, when the state ascertaining unit 32 ascertains the newest state and the previous state as the state of the same traffic signal at the time of determination of the state determining unit 42, the state determining unit 42 determines whether the signal lamp which is turned on in the traffic signal is changed between the newest state and the previous state.

When the state ascertaining unit 32 ascertains only the newest state of the traffic signal which is obeyed by the host vehicle 11 at the time of determination of the state determining unit 42, the state determining unit 42 determines which signal lamp is turned on in the newest state of the traffic signal, that is, in the current state of the traffic signal.

The state determining unit 42 sets the notification restriction flag 34 to the OFF state or sets the notification restriction flag 34 to the ON state depending on the determination result of the state determining unit 42.

The estimation unit 43 estimates whether the host vehicle 11 can turn to the right at the intersection based on host vehicle information which is information on the state of the host vehicle 11. That is, when a traveling speed of the host vehicle 11 is equal to or higher than a predetermined speed after the state determining unit 42 determines that the state of the traffic signal is changed from the first state to the second state, the estimation unit 43 estimates that the host vehicle 11 can turn to the right at the intersection IS. The traveling speed of the host vehicle 11 is an example of the host vehicle information. More specifically, the estimation unit 43 determines whether the traveling speed of the host vehicle 11 is equal to or higher than the predetermined speed based on a signal corresponding to the vehicle speed input to the control device 22.

As described above, after the host vehicle 11 reaches the central portion C of the intersection IS by slow traveling or after the driver checks whether pedestrians and bicycles are present at a right turn destination or checks whether other vehicle have stopped at the right turn destination, the driver generally accelerates the host vehicle 11 to cause the host vehicle 11 to cross the opposing path OR. Alternatively, when the driver determines that an oncoming vehicle OC is not present, the driver generally accelerates the host vehicle 11 from the stop line SL. Accordingly, after the state of the traffic signal is changed from the first state to the second state, it is possible to estimate whether the host vehicle 11 can turn to the right in a traffic flow based on whether the traveling speed is equal to or higher than the predetermined speed.

When the estimation unit 43 estimates that the host vehicle 11 can turn to the right, the notification restriction flag 34 is set to the OFF state. On the other hand, when the estimation unit 43 estimates that the host vehicle 11 cannot turn to the right, the notification restriction flag 34 is set to the ON state.

The instruction unit 44 is an example of a control unit that controls notification of information using the HMI 23 and causes the HMI 23 to notify information on the presence of an oncoming vehicle OC entering the intersection IS or restricts notification using the HMI 23 depending on the state of the notification restriction flag 34. That is, when the notification restriction flag 34 is in the OFF state, the instruction unit 44 generates a notification signal for causing the HMI 23 to perform notification and outputs the generated notification signal to the HMI 23. On the other hand, when the notification restriction flag 34 is in the ON state, the instruction unit 44 does not generate the notification signal for causing the HMI 23 to perform the notification.

In this way, the instruction unit 44 restricts notification of information using the HMI 23 in the following period in a state in which the change detecting unit 41 detects a path change of the host vehicle 11. That is, the instruction unit 44 restricts notification of information using the HMI 23 over a restriction period which is a period from the time point at which the state determining unit 42 determines that the state of the traffic signal has been switched from the first state to the second state until the estimation unit 43 estimates that the host vehicle 11 can turn to the right at the intersection IS based on the host vehicle information after the determination. The instruction unit 44 releases restriction of the notification of information using the HMI 23 when the restriction period has elapsed.

The instruction unit 44 releases the restriction of notification over a period in the state of the traffic signal is the second state from a time point at which the restriction period has elapsed, and changes the state of the HMI 23 as follows when a predetermined period has elapsed from a time point at which the state determining unit 42 determines that the state of the traffic signal has been switched from the second state to the first state. That is, the instruction unit 44 switches the state of the HMI 23 from a state in which the restriction of notification using the HMI 23 is released to a state in which the notification is restricted.

When a predetermined period has elapsed from the time point at which the state determining unit 42 has been switched from the second state to the third state, the instruction unit 44 switches the state of the HMI 23 from the state in which the restriction of notification is released to the state in which the notification is restricted.

When the HMI 23 notifies of information on the presence of an oncoming vehicle OC, the instruction unit 44 has only to cause the HMI 23 to notify of information corresponding to oncoming vehicle information. For example, when the oncoming vehicle information is information indicating that an oncoming vehicle OC is present in a path in front of the intersection IS in the opposing path OR, the instruction unit 44 has only to cause the HMI 23 to notify that an oncoming vehicle OC is present. On the other hand, when the oncoming vehicle information is information indicating that an oncoming vehicle OC is not present in the path in front of the intersection IS in the opposing path OR, the instruction unit 44 has only to cause the HMI 23 to notify that an oncoming vehicle OC is not present.

In this way, in this embodiment, the on-board communication device 21, the control device 22, and the HMI 23 constitute an example of the driving support device.

[Driving Support Process Routine]

A driving support process routine which is performed by the control device 22 will be described below with reference to FIGS. 6 to 8. The driving support process routine is a routine which is performed at predetermined time intervals by the control device 22.

As illustrated in FIG. 6, when the change detecting unit 41 does not detect a path change due to the right turn (NO in Step S11), the control device 22 ends the driving support process routine without performing support by notification regardless of the state of the notification restriction flag 34 (Step S20). On the other hand, when the change detecting unit 41 detects a path change due to the right turn (YES in Step S11), the control device 22 determines whether the state ascertaining unit 32 ascertains the previous state of the traffic signal, that is, the state of the traffic signal previous to the newest state at the time of determination of the state determining unit 42 (Step S12).

When the state ascertaining unit 32 does not ascertain the previous state of the traffic signal (NO in Step S12), the state determining unit 42 determines whether the newest state of the traffic signal is the state in which the red signal lamp is turned on or the state in which the red signal lamp and the arrow signal lamp indicating the right turn are turned on (Step S13).

When the state determining unit 42 determines that the newest state of the traffic signal does not correspond to any state thereof (NO in Step S13), the state determining unit 42 determines whether the newest state of the traffic signal is the state in which the yellow signal lamp is turned on (Step S14). When the state determining unit 42 determines that the newest state of the traffic signal is not the state in which the yellow signal lamp is turned on (NO in Step S14), the state determining unit 42 determines whether the newest state of the traffic signal is the state in which the green signal lamp is turned on (Step S15).

When the state determining unit 42 determines that the newest state of the traffic signal is the state in which the green signal lamp is turned on (YES in Step S15), the state determining unit 42 sets the notification restriction flag 34 to the OFF state (Step S16). When the state determining unit 42 determines that the newest state of the traffic signal is the state in which the yellow signal lamp is turned on in Step S14 (YES In Step S14), the process of Step S16 is also performed.

Subsequently, the instruction unit 44 causes the HMI 23 to notify of information on the presence of an oncoming vehicle OC entering the intersection IS based on the state of the notification restriction flag 34 (Step S17). When the process of Step S17 ends, the control device 22 ends the driving support process routine.

On the other hand, when the state determining unit 42 determines that the newest state of the traffic signal is not the state in which the green signal lamp is turned on in Step S15 (NO in Step S15), the control device 22 ends the driving support process routine without performing support by notification regardless of the state of the notification restriction flag 34. In this way, when the state determining unit 42 determines that none of the conditions of Steps S13, S14, and S15 is satisfied, the traffic signal which is obeyed by the host vehicle 11 at the intersection IS is not a traffic signal which is to be notified and thus the control device 22 ends the driving support process routine. Alternatively, since the state ascertaining unit 32 does not ascertain the newest state of the traffic signal, the control device 22 ends the driving support process routine.

On the other hand, when the state determining unit 42 determines that the newest state of the traffic signal is the state in which the red signal lamp is turned on or the state in which the red signal lamp and the arrow signal lamp indicating the right turn are turned on in Step S13 (YES in Step S13), the state determining unit 42 sets the notification restriction flag 34 to the ON state (Step S18). Subsequently, the instruction unit 44 restricts notification of information on the presence of an oncoming vehicle OC using the HMI 23 depending on the state of the notification restriction flag 34 (Step S19). When the process of Step S19 ends, the control device 22 ends the driving support process routine.

In this way, when the state ascertaining unit 32 ascertains only the newest state of the traffic signal and the red signal lamp is turned on or the red signal lamp and the arrow signal lamp indicating the right turn are turned on, notification of information on the presence of an oncoming vehicle OC is restricted.

When the red signal lamp is turned on, the driver cannot perform the right turn of the host vehicle 11. On the other hand, when the red signal lamp and the arrow signal lamp indicating the right turn are turned on, the traffic signal which is obeyed by an oncoming vehicle OC indicates prohibition of passage through the intersection by traveling straight ahead and there is a high likelihood that the driver can turn to the right safely at the intersection IS without paying attention to the presence of the oncoming vehicle OC.

In this regard, when the state ascertaining unit 32 ascertains only the newest state of the traffic signal, the control device 22 can perform notification suitable for a traffic flow following the change of the traffic signal to restrict the notification in that case.

On the other hand, when the state ascertaining unit 32 ascertains the state of the traffic signal previous to the newest state (YES In Step S12), the following process routine illustrated in FIG. 7 is performed.

That is, as illustrated in FIG. 7, the control device 22 determines whether a signal lamp which is turned on in the traffic signal has changed (Step S21). When the control device 22 determines that the signal lamp which is turned on in the traffic signal has not changed (NO in Step S21), the control device 22 ends the driving support process routine. Accordingly, the notification state using the HMI 23 is maintained in the state which has been set in the previous cycle.

On the other hand, when the control device 22 determines that the signal lamp which is turned on in the traffic signal has changed (YES in Step S21), the control device 22 determines whether the following condition is satisfied. That is, at the time of determination of the state determining unit 42, the state determining unit 42 determines whether the previous state of the traffic signal, that is, the state previous to the newest state, is the state in which the red signal lamp is turned on and the current state, that is, the newest state, of the traffic signal is the state in which the green signal lamp is turned on (Step S22).

When the state determining unit 42 determines that the previous state of the traffic signal is the state in which the red signal lamp is turned on and the current state of the traffic signal is the state in which the green signal lamp is turned on (YES in Step S21), the instruction unit 44 determines whether the traveling speed of the host vehicle 11 is equal to or higher than a threshold value which is a predetermined traveling speed (Step S23).

When the instruction unit 44 determines that the traveling speed of the host vehicle 11 is equal to or higher than the threshold value (YES in Step S23), the estimation unit 43 sets the notification restriction flag 34 to the OFF state (Step S24). Subsequently, the instruction unit 44 causes the HMI 23 to notify of information on the presence of an oncoming vehicle OC based on the state of the notification restriction flag 34 (Step S25). When the process of Step S25 is performed, the control device 22 ends the driving support process routine.

On the other hand, when the estimation unit 43 determines that the traveling speed of the host vehicle 11 is lower than the threshold value (NO in Step S23), the estimation unit 43 sets the notification restriction flag 34 to the ON state (Step S26) and the instruction unit 44 restricts notification of information on the presence of an oncoming vehicle OC using the HMI 23 based on the state of the notification restriction flag 34 (Step S27).

When the state determining unit 42 determines that at least one of the condition that the previous state of the traffic signal is the state in which the red signal lamp is turned on and the condition that the current state of the traffic signal is the state in which the green signal lamp is turned on is not satisfied In Step S22 (NO in Step S22), the state determining unit 42 determines whether the state of the traffic signal satisfies the following conditions. That is, the state determining unit 42 determines whether the previous state of the traffic signal is the state in which the yellow signal lamp is turned on and the current state of the traffic signal is the state in which the red signal lamp and the arrow signal lamp indicating the right turn are turned on (Step S28).

When the state determining unit 42 determines that at least one of the condition that the previous state of the traffic signal is the state in which the yellow signal lamp is turned on and the condition that the current state of the traffic signal is the state in which the red signal lamp and the arrow signal lamp indicating the right turn are turned on is not satisfied (NO in Step S28), the state determining unit 42 determines whether the state of the traffic signal satisfies the following conditions. That is, the state determining unit 42 determines whether the previous state of the traffic signal is the state in which the yellow signal lamp is turned on and the current state of the traffic signal is the state in which the red signal lamp is turned on (Step S29).

When the state determining unit 42 determines that at least one of the condition that the previous state of the traffic signal is the state in which the yellow signal lamp is turned on and the condition that the current state of the traffic signal is the state in which the red signal lamp is turned on is not satisfied (NO in Step S29), the state determining unit 42 determines whether the state of the traffic signal satisfies the following conditions. That is, the state determining unit 42 determines whether the previous state of the traffic signal is the state in which the green signal lamp is turned on and the current state of the traffic signal is the state in which the yellow signal lamp is turned on (Step S30).

When the state determining unit 42 determines that the previous state of the traffic signal is the state in which the green signal lamp is turned on and the current state of the traffic signal is the state in which the yellow signal lamp is turned on (YES in Step S30), the state determining unit 42 sets the notification restriction flag 34 to the OFF state (Step S24). Then, the process of Step S25 is performed and the control device 22 ends the driving support process routine.

On the other hand, when the state determining unit 42 determines that at least one of the condition that the previous state of the traffic signal is the state in which the green signal lamp is turned on and the condition that the current state of the traffic signal is the state in which the yellow signal lamp is turned on is not satisfied (NO in Step S30), the control device 22 performs the following process. That is, the control device 22 ends the driving support process routine without performing support by notification regardless of the state of the notification restriction flag 34 (Step S31).

In this way, when the state determining unit 42 determines that none of the conditions of Steps S22, S28, S29, and S30 is satisfied, the traffic signal which is obeyed by the host vehicle 11 at the intersection IS is not a traffic signal which is to be notified and thus the control device 22 ends the driving support process routine. Alternatively, since the state ascertaining unit 32 does not ascertain the newest state of the traffic signal, the control device 22 ends the driving support process routine.

Figure 8:
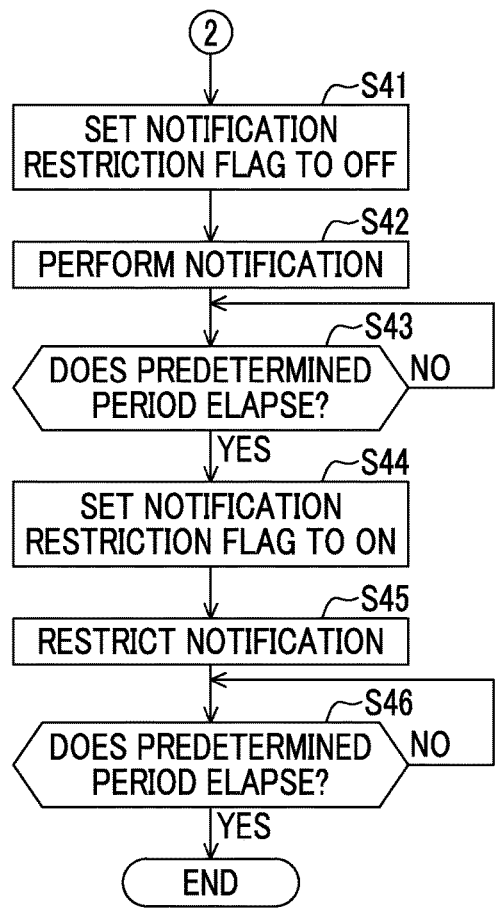
FIG. 8 is a flowchart illustrating a routine of a driving support process which is performed by the control unit according to the embodiment.

When the state determining unit 42 determines that the condition of Step S28 is satisfied (YES in Step S28) and determines that the condition of Step S29 is satisfied (YES in Step S29), the following process routine illustrated in FIG. 8 is performed.

That is, as illustrated in FIG. 8, the state determining unit 42 sets the notification restriction flag 34 to the OFF state (Step S41), and the instruction unit 44 causes the HMI 23 to notify of information on the presence of an oncoming vehicle OC based on the state of the notification restriction flag 34 (Step S42). Subsequently, the control device 22 determines whether a predetermined period has elapsed after the notification restriction flag 34 is set to the OFF state (Step S43) and maintains the notification restriction flag 34 in the OFF state until the predetermined period has elapsed (NO in Step S43).

When the control device 22 determines that the predetermined time has elapsed after the notification restriction flag 34 is set to the OFF state (YES in Step S43), the control device 22 sets the notification restriction flag 34 to the ON state (Step S44). Then, the instruction unit 44 restricts the notification using the HMI 23 based on the state of the notification restriction flag 34 (Step S45). Subsequently, the control device 22 determines whether a predetermined period has elapsed after the notification restriction flag 34 is set to the ON state (Step S46) and maintains the notification restriction flag 34 in the ON state until the predetermined period has elapsed (NO in Step S46).

The predetermined period in Step S46 is preferably a period from time ts4 to time ts1 in the next cycle when the host vehicle 11 obeys the arrow type traffic signal of the second example, and is preferably a period from time ts3 to time ts1 in the next cycle when the host vehicle 11 obeys the traffic signal of the first example.

When the control device 22 determines that the predetermined period has elapsed after the notification restriction flag 34 is set to the ON state (YES in Step S46), the control device 22 ends the driving support process routine.

[Operation of Driving Support Device]

Figure 9:
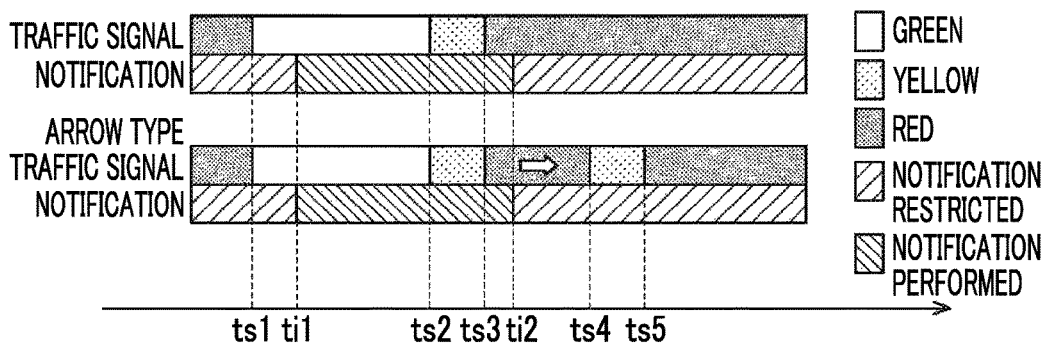
FIG. 9 is a timing chart illustrating an operation of the driving support device according to the embodiment.

An operation of the driving support device will be described below with reference to FIG. 9. As illustrated in FIG. 9, when the host vehicle 11 obeys any one of the arrow type traffic signal and the traffic signal and the state of the traffic signal at time ts1 is changed from the state in which the red signal lamp is turned on to the state in which the green signal lamp is turned on, notification using the HMI 23 is restricted up to time ti1 at which the traveling speed of the host vehicle 11 is equal to or higher than the threshold value.

As described above, the period immediately after time ts1 is a period in which the driver causes the host vehicle 11 to travel straight ahead from the stop position to the right turn start position or checks whether pedestrians or bicycles are present and whether a congestion is present. Generally, after the host vehicle 11 reaches the right turn start position or after the driver checks that pedestrians or bicycles are not present and a congestion is not present, the driver accelerates the host vehicle 11 to turn to the right.

That is, according to the driving support device, it is possible to perform notification of information on an oncoming vehicle OC which is suitable for a traffic flow following a change of the state of the traffic signal.

When the host vehicle 11 obeys the traffic signal of the first example, the driver stops the host vehicle 11 in a period from time ts3 to time ts1 in the next cycle. Immediately after time ts3, the driver may cause the host vehicle 11 to turn to the right, for example, when the host vehicle 11 already enters the intersection IS as described above.

In this regard, in the driving support device, restriction of notification using the HMI 23 is started at time ti2 at which a predetermined period has elapsed from time ts3. Accordingly, it is possible to perform notification of information on an oncoming vehicle which is suitable for a traffic flow following a change of the state of the traffic signal.

On the other hand, when the host vehicle 11 obeys the arrow type traffic signal of the second example, as described above, there is a high likelihood that the host vehicle 11 can turn to the right and the oncoming vehicle OC cannot pass through the intersection IS by traveling straight ahead in a period from time ts3 to time ts5. The oncoming vehicle OC may travel continuously straight ahead immediately after time ts3.

In this regard, in the driving support device, restriction of notification using the HMI 23 is started at time ti2 at which a predetermined period has elapsed from time ts3. Accordingly, it is possible to perform notification of information on an oncoming vehicle OC which is suitable for a traffic flow following a change of the state of the traffic signal.

The period from time ts3 to time ti2 in the arrow type traffic signal of the second example and the period from time ts3 to time ti2 in the traffic signal of the first example may have the same length or may have different lengths.

When the driver determines that an oncoming vehicle OC does not pass through the intersection IS by traveling straight ahead at time ts1, the driver may increase the traveling speed of the host vehicle 11 to be equal to or higher than a predetermined traveling speed at time ts1. In this case, at a time point at which the driver accelerating the host vehicle 11, it is possible to notify the driver of information on the presence of an oncoming vehicle OC.

As described above, the driving support device according to the embodiment can exhibit the following advantages. (1) Notification using the HMI 23 is restricted by the instruction unit 44 until the estimation unit 43 estimates that the host vehicle 11 can turn to the right, and thus it is possible to perform notification which is suitable for a traffic flow following a change of the state of the traffic signal at the time of a path change of the host vehicle 11.

(2) When the traveling speed of the host vehicle 11 is equal to or higher than the predetermined speed, the estimation unit 43 estimates that the host vehicle 11 can turn to the right. Accordingly, when the driver causes the host vehicle 11 to turn to the right from the right turn start position, a probability that the HMI 23 will notify of information on the presence of an oncoming vehicle OC increases. As a result, it is possible to perform notification which is suitable for a traffic flow following a change of the state of the traffic signal.

(3) Notification using the HMI 23 is performed over a predetermined period after the state of the traffic signal has been switched from the state in which the yellow signal lamp is turned on to the state in which red signal lamp is turned on, and the notification using the HMI 23 is restricted when the predetermined period has elapsed. Accordingly, it is possible to perform notification which is suitable for a traffic flow following a change of the state of the traffic signal.

(4) The instruction unit 44 permits notification using the HMI 23 over a predetermined period from a time point at which the state of the traffic signal has been switched from the state in which the yellow signal lamp is turned on to the state in which the red signal lamp and the arrow signal lamp indicating the right turn are turned on, and restricts the notification using the HMI 23 when the predetermined period has elapsed. Accordingly, it is possible to perform notification which is suitable for a traffic flow following a change of the state of the traffic signal.

The above-mentioned embodiment can be appropriately modified as follows. When the host vehicle 11 obeys the arrow type traffic signal of the second example, the state determining unit 42 may set the notification restriction flag 34 to the ON state at a time point at which the state determining unit 42 determines that the state of the traffic signal is changed from the state in which the yellow signal lamp is turned on to the state in which the red signal lamp and the arrow signal lamp indicating the right turn are turned on.

With this configuration, it is also possible to perform notification which is suitable for a traffic flow following a change of the state of the traffic signal by restricting the notification until a restriction period has elapsed after at least the state of the traffic signal is changed from the state in which the red signal lamp is turned on to the state in which the green signal lamp is turned on.

The state determining unit 42 may set the notification restriction flag 34 to the ON state at a time point at which the state determining unit 42 determines that the state of the traffic signal is changed from the state in which the yellow signal lamp is turned on to the state in which the red signal lamp is turned on. With this configuration, it is also possible to perform notification which is suitable for a traffic flow following a change of the state of the traffic signal by restricting the notification until a restriction period has elapsed after at least the state of the traffic signal is changed from the state in which the red signal lamp is turned on to the state in which the green signal lamp is turned on.

For example, in the following cases, the state determining unit 42 may determine that the state of the traffic signal is changed from the first state to the second state. For example, when the state determining unit 42 determines that the state in which the yellow signal lamp is turned on which is subsequent to the state in which the red signal lamp and the arrow signal lamp indicating a turn other than the right turn are turned on is the previous state of the traffic signal and the current state of the traffic signal is the state in which the red signal lamp and the arrow signal lamp indicating the right turn are turned on, the state determining unit 42 may determine that the state of the traffic signal is changed from the first state to the second state. For example, when the state determining unit 42 determines that the state of the traffic signal is changed from the state in which the red signal lamp is turned on to the state in which the red signal lamp and the arrow signal lamp indicating at least the right turn are turned on, the state determining unit 42 may determine that the state of the traffic signal is changed from the first state to the second state.

In any case of the above-mentioned cases, immediately after the state of the traffic signal has been switched from the state in which the right turn is prohibited to the state in which the right turn is permitted, there is a high likelihood that the driver causes the host vehicle 11 to travel straight ahead from the stop position to the right turn start position at the intersection IS. Alternatively, there is a high likelihood that the driver checks whether pedestrians or bicycles are present at the right turn destination or checks whether other vehicle have stopped at the right turn destination. Accordingly, it is possible to perform notification which is suitable for a traffic flow following a change of the state of the traffic signal.

When a predetermined period has elapsed from a time point at which the state determining unit 42 determines that the state of the traffic signal has been switched from the first state to the second state, the estimation unit 43 may estimate that the host vehicle 11 can turn to the right. That is, instead of Step S22, the estimation unit 43 may determine whether a predetermined period has elapsed in a state in which the host vehicle 11 does not turn to the right from a time point at which the state determining unit 42 determines that the previous state of the traffic signal is the state in which the red signal lamp is turned on and the current state of the traffic signal is the state in which the green signal lamp is turned on. The predetermined period from the time point at which the state determining unit 42 determines that the state of the traffic signal has been switched from the first state to the second state represents the elapse of time in a state in which the host vehicle 11 does not turn, that is, a change of the state of the host vehicle 11, from the time point at which the host vehicle 11 performs such determination, and thus is an example of host vehicle information.

With this configuration, the following advantages can be obtained. (5) At the time of a path change of the host vehicle 11, a predetermined period is required to cause the host vehicle 11 to move from the stop position to the right turn start position, to check whether pedestrians or bicycles are present at the right turn destination, or to check whether other vehicles have stopped at the right turn destination. With the configuration, when a predetermined time has elapsed from a time point at which the state determining unit 42 determines that the state of the traffic signal has been switched from the first state to the second state, the estimation unit 43 estimates that the host vehicle 11 can turn to the right. Accordingly, when the driver causes the host vehicle 11 to turn to the right, a probability that the HMI 23 will notify of information on the presence of an oncoming vehicle OC increases. As a result, it is possible to perform notification which is suitable for a traffic flow following a change of the state of the traffic signal.

Instead of Step S22, the estimation unit 43 may determine whether the host vehicle 11 is located at the central portion C of the intersection IS which is the right turn start position and may estimate that the host vehicle 11 can turn to the right as the host vehicle 11 is located at the central portion C of the intersection IS. That is, after the state determining unit 42 determines that the state of the traffic signal has been switched from the first state to the second state, the state determining unit 42 may determine whether the position of the host vehicle 11 is located at the central portion C. With this configuration, the estimation unit 43 can determine whether the host vehicle 11 is located at the central portion C of the intersection IS, for example, based on the position information output from the GPS receiver 26 and the map information stored in the map information storage device 27. The change in position of the host vehicle 11 after the state of the traffic signal has been switched from the first state to the second state indicates a change of the state of the host vehicle 11 and thus is an example of the host vehicle information.

Instead of Step S22, the estimation unit 43 may determine whether an acceleration of the host vehicle 11 is equal to or higher than a threshold value which is a predetermined acceleration, and may estimate that the host vehicle 11 can turn to the right when the acceleration of the host vehicle 11 is equal to or higher than the threshold value. With this configuration, the host vehicle 11 preferably includes an acceleration sensor that detects the acceleration of the host vehicle 11. The acceleration of the host vehicle 11 is an example of the host vehicle information.

When information on the presence of an oncoming vehicle OC is notified using both a voice and a message, notification of information may be performed using only one of the voice and the message by restricting the notification. When information on the presence of an oncoming vehicle OC is notified using a voice, a sound volume at the time of notification may be set to be smaller by restricting the notification in comparison with a state in which the restriction of notification is released. With this configuration, when the notification restriction flag 34 is set to the ON state, the instruction unit 44 can generate a notification restriction signal for notification using the HMI 23 in a restricted state.

The on-board communication device 21 of the host vehicle 11 may be configured to communicate with another vehicle. In this configuration, the host vehicle 11 may acquire traffic signal information of the traffic signal which is obeyed by the host vehicle 11 at the intersection IS from a preceding vehicle.

The host vehicle 11 may include an imaging unit that images signal lamps of a traffic signal which is obeyed by the host vehicle 11 at the intersection IS. In this configuration, the control device 22 can input image data captured by the imaging unit as traffic signal information. That is, the state ascertaining unit 32 may be configured to accumulate the image data and the state determining unit 42 may be configured to determine the state of the traffic signal based on the image data. In this configuration, the control device 22 is an example of a state acquiring unit.

The host vehicle 11 may include an imaging unit that images a part in front of the host vehicle 11 as a surrounding environment of the host vehicle 11. In this configuration, the change detecting unit 41 may determine whether the host vehicle 11 is located in the vicinity of the intersection IS using the image data captured by the imaging unit.

The control device 22 may determine whether a preceding vehicle of the host vehicle 11 is present in the first path R1. In this configuration, the host vehicle 11 can include a sensor that detects a distance from an object located in front of the host vehicle 11, that is, another vehicle, and outputs a signal corresponding to the detected distance to the control device 22. The control device 22 may include a preceding vehicle detecting unit that determines that a preceding vehicle is present when a distance between the host vehicle 11 and an object in front thereof is equal to or less than a threshold value based on the signal corresponding to the distance. The control device 22 can treat the detection result from the preceding vehicle detecting unit as surrounding information.

The process of the preceding vehicle detecting unit can be performed between Step S11 and Step S12. When the preceding vehicle detecting unit determines that a preceding vehicle is present, the control device 22 can end the driving support process routine. On the other hand, when the preceding vehicle detecting unit determines that a preceding vehicle is not present, the control device 22 can perform the processes of Step S12 and the steps subsequent thereof.

Accordingly, when a preceding vehicle is present, notification using the HMI 23 is restricted and it is thus possible to perform notification of information on the presence of an oncoming vehicle OC which is suitable for a traffic flow.

The road communication device 12 may transmit pedestrian information which is information on whether pedestrians crossing a crosswalk are present at the intersection IS or whether bicycles crossing a crosswalk are present to the host vehicle 11. Then, the control device 22 of the host vehicle 11 can determine whether pedestrians or bicycles are present at a crosswalk which is crossed when the host vehicle 11 turns to the right at the intersection IS based on the pedestrian information, and the HMI 23 may notify the driver of information on the presence of pedestrians in addition to the information on the presence of an oncoming vehicle OC. Accordingly, the HMI 23 can attract a driver's attention to pedestrians when the host vehicle 11 turns to the right at the intersection IS.

Even when the host vehicle 11 travels at other intersections such as a three-way intersection or a five-way intersection as well as the above-mentioned crossroad, the driving support device can notify of information on the presence of an oncoming vehicle entering the intersection to support a driver's driving of the host vehicle 11.

The driving support device can support a driver's driving of a host vehicle in a situation in which the host vehicle travels in a lane located on the right side of a traveling lane of an oncoming vehicle in the traveling direction of the host vehicle. Accordingly, the driving support device can notify of information on the presence of an oncoming vehicle OC which is suitable for a traffic flow following a change of a state of a traffic signal when the host vehicle traveling in the first path performs a path change in which the host vehicle crosses an opposing path of the oncoming vehicle by a left turn at the intersection and enters the second path.

What is claimed is:

1. A driving support device comprising:
   a notification unit configured to notify a driver of a host vehicle of information; and
   at least one electronic control unit configured to
      detect that a path change in which a path of the host vehicle is changed from a first path in which the host vehicle enters an intersection to a second path in which the host vehicle departs from the intersection through a turn at the intersection and the host vehicle crosses a third path which is a path opposing the first path through the turn is to be performed,
      notify the driver of information on a presence of an oncoming vehicle in the third path entering the intersection, by the notification unit,
      acquire a state of a traffic signal which is obeyed by the host vehicle at the intersection,
      determine whether the state of the traffic signal has been switched from a first state in which the turn of the host vehicle is prohibited to a second state in which the turn of the host vehicle is permitted,
      estimate whether the host vehicle is able to perform the turn at the intersection based on information on a state of the host vehicle, and
      restrict notification of the information from the notification unit over a restriction period which is a period from a first time point at which it is determined that the state of the traffic signal has been switched from the first state to the second state to a time point at which the host vehicle is estimated to be able to perform the turn at the intersection based on the information on the state of the host vehicle after the first time point, and to release the restriction of the notification of the information when the restriction period has elapsed from the first time point, in a state in which it is detected that the path change is to be performed.

2. The driving support device according to claim 1, wherein
   the at least one electronic control unit is configured to:
      acquire a traveling speed of the host vehicle; and
      estimate that the host vehicle is able to perform the turn at the intersection when the traveling speed of the host vehicle is equal to or higher than a predetermined speed after it is determined that the state of the traffic signal has been switched from the first state to the second state.

3. The driving support device according to claim 1, wherein
   the at least one electronic control unit is configured to estimate that the host vehicle is able to perform the turn when a predetermined time has elapsed from the first time point.

4. The driving support device according to claim 1, wherein
   the second state is a state in which the turn and traveling straight ahead for passing the intersection is both permitted,
   the first state is a state in which the turn and the traveling straight ahead is prohibited, and
   the at least one electronic control unit is configured to:
      determine whether the state of the traffic signal has been switched from the second state to the first state; and
      release the restriction of the notification over a period in which the state of the traffic signal is the second state after the restriction period has elapsed and switch a state of the notification unit from a state in which the restriction of the notification is released to a state in which the notification is restricted when a first predetermined period has elapsed from a second time point at which it is determined that the state of the traffic signal has been switched from the second state to the first state.

5. The driving support device according to claim 1, wherein
   the second state is a state in which the turn and traveling straight for passing through the intersection is both permitted, and
   the at least one electronic control unit is configured to:
      determine whether the state of the traffic signal has been switched from the second state to a third state in which only the turn from the turn and the traveling straight ahead of the host vehicle is permitted; and
      release the restriction of the notification over a period in which the state of the traffic signal is the second state after the restriction period has elapsed and switch a state of the notification unit from a state in which the restriction of the notification is released to a state in which the notification is restricted when a second predetermined period has elapsed from a third time point at which it is determined that the state of the traffic signal has been switched from the second state to the third state.

6. A driving support device comprising:
a notification unit configured to notify a driver of a host vehicle of information; and
at least one electronic control unit configured to
   detect that a path change in which a path of the host vehicle is changed from a first path in which the host vehicle enters an intersection to a second path in which the host vehicle departs from the intersection through a turn at the intersection and the host vehicle crosses a third path opposing the first path through the turn is to be performed,
   notify the driver of information on a presence of an oncoming vehicle in the third path entering the intersection, by the notification unit,
   acquire a state of a traffic signal which is obeyed by the host vehicle at the intersection,
   determine whether the state of the traffic signal has been switched from a second state in which the turn and traveling straight ahead for passing through the intersection is permitted to a first state in which the turn and the traveling straight ahead is prohibited, and
   switch a state of the notification unit from a state in which restriction of the notification is released to a state in which the notification is restricted when a predetermined period has elapsed after it is determined that the state of the traffic signal has been switched from the second state to the first state in a state in which the path change is detected to be performed.

7. A driving support device comprising:
a notification unit configured to notify a driver of a host vehicle of information; and
at least one electronic control unit configured to
   detect that a path change in which a path is changed from a first path in which the host vehicle enters an intersection to a second path in which the host vehicle departs from the intersection through a turn at the intersection and the host vehicle crosses a third path opposing the first path through the turn is performed,
   notify the driver of information on a presence of an oncoming vehicle in the third path entering the intersection, by the notification unit,
   acquire a state of a traffic signal which is obeyed by the host vehicle at the intersection,
   determine whether the state of the traffic signal has been switched from a second state in which the turn and traveling straight ahead for passing through the intersection is both performed to a third state in which only the turn from the turn and the traveling straight is permitted, and
   switch a state of the notification unit from a state in which restriction of the notification is released to a state in which the notification is restricted when a predetermined period has elapsed after it is determined that the state of the traffic signal has been switched from the second state to the third state in a state in which the path change is detected to be performed.

* * * * *